United States Patent [19]

Stenkvist

[11] Patent Number: 4,532,633
[45] Date of Patent: Jul. 30, 1985

[54] DC ARC FURNACE IMPROVED HEARTH CONSTRUCTION

[75] Inventor: Sven E. Stenkvist, Västerås, Sweden

[73] Assignee: ASEA Aktiebolag, Vasteras, Sweden

[21] Appl. No.: 610,698

[22] Filed: May 16, 1984

[30] Foreign Application Priority Data

Jun. 1, 1983 [SE] Sweden .................. 8303087

[51] Int. Cl.³ .............................. H05B 7/00
[52] U.S. Cl. .......................... 373/72; 373/71
[58] Field of Search .............. 373/72, 71, 108; 110/340, 338

[56] References Cited

U.S. PATENT DOCUMENTS

| 1,917,849 | 7/1933 | Northrup | 373/72 |
| 3,297,810 | 1/1967 | Lubatti | 373/72 X |
| 4,324,943 | 4/1982 | Stenkvist et al. | 373/72 |
| 4,435,812 | 3/1984 | Guido et al. | 373/72 |
| 4,435,813 | 3/1984 | Stenkvist et al. | 373/72 |

FOREIGN PATENT DOCUMENTS

| 53729 | 5/1912 | Austria | 373/72 |
| 1233538 | 5/1965 | Fed. Rep. of Germany | 373/72 |

Primary Examiner—Reinhard J. Eisenzopf
Attorney, Agent, or Firm—Kenyon & Kenyon

[57] ABSTRACT

A DC arc furnace electrically conductive hearth brickwork wear lining has metal electrical conductors extending through it which are molten for their upper portions when working and by electromagnetic flowing can erode the bricks of the brickwork. To prevent this erosion resistant refractory shields are positioned so as to shield the bricks from such flows.

3 Claims, 2 Drawing Figures

DC ARC FURNACE IMPROVED HEARTH CONSTRUCTION

BACKGROUND OF THE INVENTION

A DC arc furnace electrically conductive hearth construction is disclosed by the Stenkvist et al. U.S. Pat. No. 4,324,943, the hearth construction including a brick wear lining through which metal electrical conductors extended from top to bottom of the lining, the wear lining resting on an electrically conductive construction through which DC arc current is carried via the wear lining conductors to a furnace melt directly supported on the wear lining, providing power for an arc formed with the melt and an arcing electrode positioned above the melt in the furnace.

The metal conductors extending through the wear lining brickwork must have their upper ends in contact with the melt and consequently at least the upper portions of the conductors become molten and in effect part of the melt carried by the wear lining. The conductors become molten only throughout their upper portions but their molten portions may extend a substantial distance downwardly from the top of the brickwork wear lining.

The bricks of the brickwork may be the usual dolomite or magnesite bricks known to have satisfactorily long service lives in more conventional hearth constructions but in the case of the conductive brick wear lining of the patent unusual brick wear has been experienced. The present inventor has analyzed this problem as follows:

The conductors' molten portions carry the arcing current to the melt and thus to the arc and although the current is distributed throughout the various wear bottom conductors the current carried by the molten portions of each conductor is substantial. This results in electromagnetic effects causing a circulation of the molten metal of the conductors in the bricks of the wear bottom brickwork, resulting in melt flows which erode away the bricks contacted by the melt flows.

SUMMARY OF INVENTION

Briefly summarized, and with the above in mind, this invention comprises the positioning of erosion resistant refractory erosion shields between the electrical conductors and the bricks of the electrically conductive brickwork wear lining. This is possible during the construction of the lining. Because these shields can be of small volume as compared to the bricks they can be made of more expensive and better erosion resistance refractory than the bricks themselves, as exemplified by meltcast magnesite or the newer types of refractory made by the isostatic compaction technique. These parts should be suitably shaped so as to be interposed between the brick surfaces and the metal conductors, particularly including their upper portions which become molten under the furnace operating conditions. With the bricks thus protected the electrically conductive brickwork lining has a substantially longer service life.

When the metal conductors extending through the brickwork wear lining are in the form of the bars described by the patent, the new erosion resistant shields may be in the form of tubes through which the bars are inserted. Also, as described by that patent, metal-cased refractory bricks may be used for the wear lining and in this case the erosion resistance shields may be in the form of thin plates laid between the metal-cased bricks.

BRIEF DESCRIPTION OF THE DRAWINGS

The accompanying drawings serve to illustrate the foregoing and in which.

DETAILED DESCRIPTION OF THE INVENTION

Figure 1:
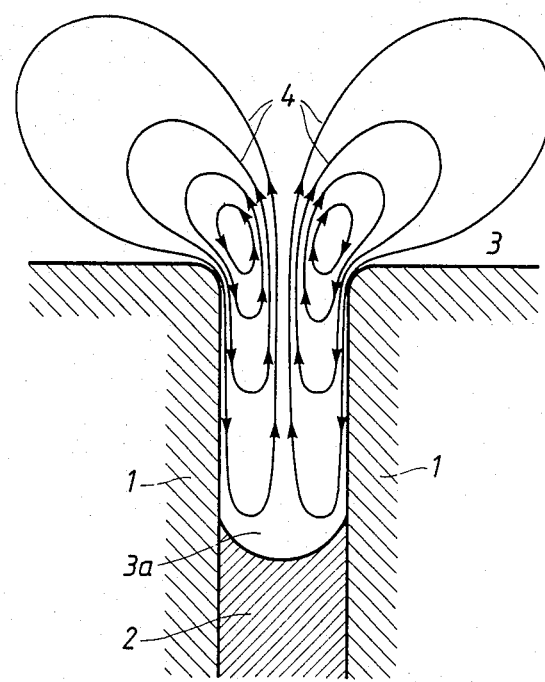
FIG. 1 in vertical section shows the bricks and the melt flow that occurs in the melted upper portion of one of the conductors.

In the drawings FIG. 1 shows two adjacent bricks 1 of, for example, conventional dolomite or magnesite types, and the electrical conductor 2 that extends through or between these bricks as described by the U.S. Pat. No. 4,324,943. These parts are to be understood as being part of the electrically conductive wear lining of that patent. The melt 3 above the brickwork has melted the conductor 2 throughout its upper portion so as to form a small sump 3a within or between the bricks. This sump of metal is under the influence of the electromagnetic effects of the DC current being carried to the melt above the bricks. The metal in the sump is completely molten both because of heat conducted to it from the melt above the bricks and heated by the arc, and because the sump of molten metal is carrying its portion of the DC power to the melt with consequent electric resistance heating effects. The electromagnetic drive or flow that occurs under these effects is illustrated by the flow lines and their arrows shown at 4 in FIG. 1.

Figure 2:
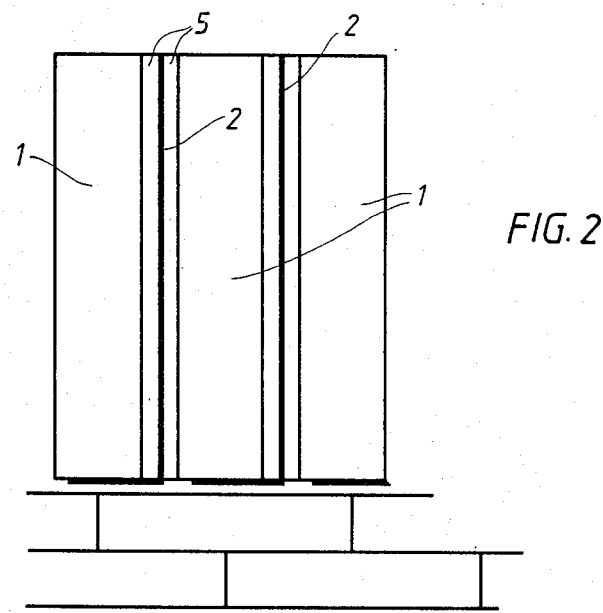
FIG. 2 in side elevation shows the use of erosion resistant shields in the case of metal-cased bricks forming the electrically conductive wear lining.

In FIG. 2 the electrically conductive brickwork hearth is shown as it appears when using metal-cased refractory bricks and specifically when in the form of the partially metal-cased bricks disclosed by U.S. Pat. No. 4,435,813. However, whether or not the electric conductors are of this type or the rods previously mentioned, the effect is as illustrated by FIG. 1.

FIG. 2 shows shields in the form of plates 5 of the erosion resistant refractory material, positioned between the conductors 2 and the bricks 1, the conductors 2 in this case being the metal-casings of the bricks.

As shown by FIG. 2 the plates 5 are thin and of relatively small volumes as compared to the volumes of the bricks 1. Therefore, the shield plates, or equivalent parts such as required when the conductors are in the form of rods, may be made of erosion resistant refractory material having a cost too great for use in making the bricks 1 themselves. As previously indicated, examples are melt-case magnesite or the newer types of material made by the isostatic compaction method.

When the principles of this invention are used the electrical conductors 2 still melt throughout their upper portions when the wear lining is in service. However, the melt flow shown at 4 in FIG. 1 is now held out of contact with the conventional bricks, by the more erosion resistant shield parts, such as the plates 5, which now confine the melt flows. The result is that the electrically conductive brick wear lining of the previously mentioned patents, has a longer service life.

What is claimed is:

1. A DC arc furnace conductive hearth lining comprising a brickwork formed by bricks having bottoms and tops contacted by a furnace melt, electric conductors extending through the brickwork from the bottoms to the tops of the bricks, the conductors having upper portins which become molten metal when heated by the melt and form sumps of molten metal which can circulate, and shields positioned between the conductors and the bricks and extending for the lengths of the conductors including their upper portions which become molten, the bricks being made of a refractory having a relatively low resistance to erosion from circulating molten metal and the shields being made of a refractory having a relatively higher resistance to such erosion.

2. The lining of claim 1 in which said shields are of small volume as compared to the bricks.

3. The lining of claim 2 in which the bricks are made of conventional hearth refractory and the shields are made of a refractory that is more erosion resistant than the bricks' refractory.

* * * * *